United States Patent [19]

Ichinoi et al.

[11] Patent Number: 4,628,369
[45] Date of Patent: Dec. 9, 1986

[54] VIDEO SIGNAL DROPOUT COMPENSATION CIRCUIT

[75] Inventors: Yutaka Ichinoi, Yokohama; Naomichi Nishimoto, Tokyo, both of Japan

[73] Assignee: Victor Company of Japan, Ltd., Japan

[21] Appl. No.: 588,378

[22] Filed: Mar. 12, 1984

[30] Foreign Application Priority Data

Mar. 17, 1983 [JP] Japan .................................. 58-44766

[51] Int. Cl.[4] .......................... H04N 5/76; H04N 9/493
[52] U.S. Cl. .................................................... 358/314
[58] Field of Search ................. 358/310, 314, 327, 11, 358/12, 14, 15, 21 R, 142, 335, 340, 336; 360/33.1, 38.1

[56] References Cited

U.S. PATENT DOCUMENTS 3,586,762  6/1971  Hodge et al. .
3,781,463  12/1973  Bussche .............................. 358/320
4,199,780  4/1980  Taylor .
4,245,235  1/1981  Poetsch ................................ 358/14

FOREIGN PATENT DOCUMENTS 2811266  9/1982  Fed. Rep. of Germany .
8103098  10/1981  PCT Int'l Appl. .
1436757  5/1976  United Kingdom .
1516885  7/1978  United Kingdom .
1535376  12/1978  United Kingdom .

Primary Examiner—Robert L. Richardson

Attorney, Agent, or Firm—Andrus, Sceales, Starke & Sawall

[57] ABSTRACT

A video signal dropout compensation circuit is provided in a reproducing apparatus which reproduces a recorded signal from a recording medium recorded with a time-division-multiplexed signal which has been frequency modulated. The apparatus frequency-demodulates a reproduced frequency modulated time-division-multiplexed signal in a demodulator, and time base expands a time base compressed line-sequential color difference signal and a time base compressed luminance signal within a reproduced time-division-mulitplexed signal back to an original time base to obtain a reproduced line-sequential color difference signal and a reproduced luminance signal. The compensation circuit comprises a detecting circuit for producing a dropout detection signal when the reproduced frequency modulated time-division-multiplexed signal assumes a level smaller than a preset level, a switching circuit controlled in response to an output signal of the detecting circuit, and a delay circuit for delaying an output signal of the switching circuit by a delay time of two horizontal scanning periods. The switching circuit selectively supplies to the demodulator and the delay circuit the reproduced frequency modulated time-division-multiplexed signal while the dropout detection signal is not produced from the detecting circuit, and the output signal of the delay circuit while the detecting circuit produces the dropout detection signal.

3 Claims, 14 Drawing Figures

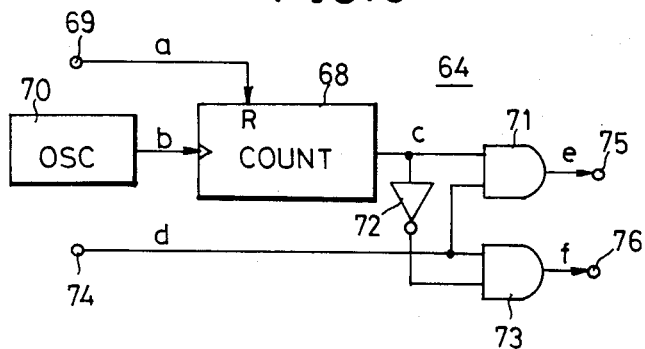
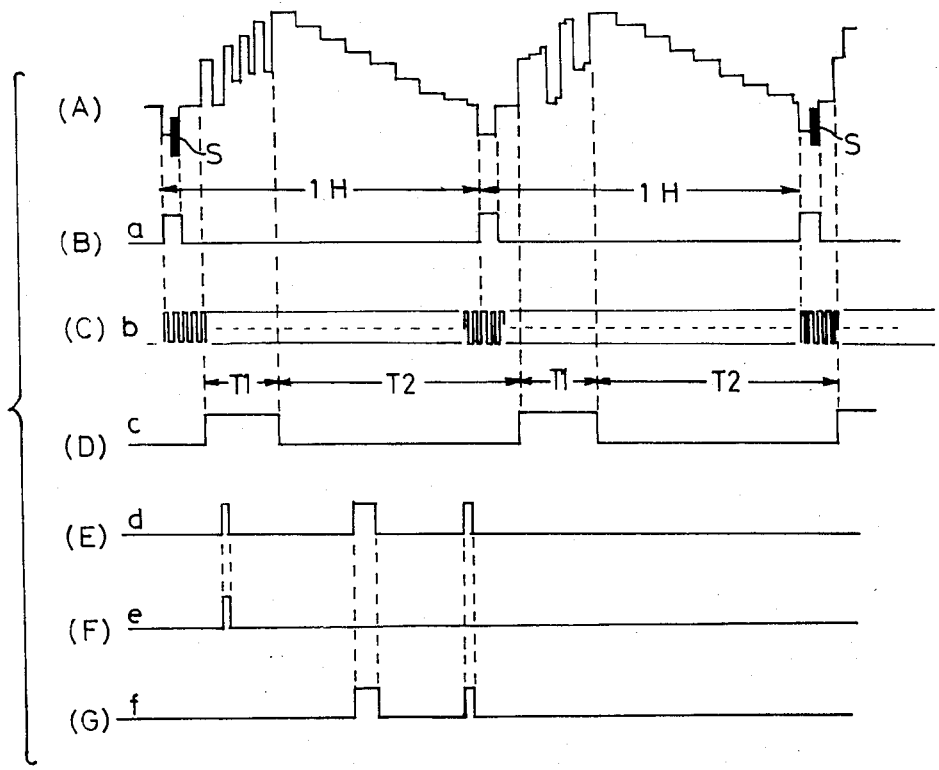

VIDEO SIGNAL DROPOUT COMPENSATION CIRCUIT

BACKGROUND OF THE INVENTION

The present invention generally relates to video signal dropout compensation circuits, and more particularly to a video signal dropout compensation circuit which is provided within a reproducing apparatus for reproducing a recorded signal from a recording medium which is recorded with a frequency modulated time-division-multiplexed signal, and compensates for a dropout in the reproduced time-division-multiplexed signal by use of a delay circuit. The time-division-multiplexed signal is obtained by subjecting a line-sequential color difference signal and a luminance signal corresponding to one horizontal scanning period to a time base compression, and time-division-multiplexing the time base compressed signals within a duration of one horizontal scanning period.

Among the existing color video signal recording and reproducing apparatuses such as video tape recorders (VTRs), the more popular recording and reproducing apparatuses separate a luminance signal and a carrier chrominance signal from a standard system composite color video signal. The standard system is a system such as the NTSC system, the PAL system, and the SECAM system. The separated luminance signal is frequency-modulated, and the separated carrier chrominance signal is frequency-converted into a low frequency range. The frequency converted carrier chrominance signal is frequency-division-multiplexed with the frequency modulated luminance signal and recorded on a recording medium. At the time of the reproduction, a signal processing opposite to the signal processing carried out at the time of the recording, is carried out to obtain a reproduced composite color video signal which is in conformance with the original standard system. In other words, the more popular recording and reproducing apparatuses employ the so-called low-band-conversion recording and reproducing system.

Other various recording and reproducing systems have been proposed besides the low-band-conversion recording and reproducing system. For example, there was a proposed recording and reproducing apparatus which was designed to subject two kinds of color difference signals which are obtained by frequency-demodulating the carrier chrominance signal to a time base compression, and also subject the luminance signal to a time base compression. According to this proposed recording and reproducing apparatus, the time base compressed signals are time-division-multiplexed, and the time division multiplexed signal is frequency-modulated and recorded on the recording medium. At the time of the reproduction, a signal processing opposite to the signal processing carried out at the time of the recording, is carried out to obtain a reproduced composite color video signal which is in conformance with the original standard system. An example of such a recording and reproducing apparatus may be found in the U.S. Pat. Nos. 3,781,463 and 4,245,235, for example. This proposed recording and reproducing apparatus takes into account the difference in the bands of the luminance signal and the color difference signals, and takes measures so that the color difference signals having the narrower band can be transmitted within the horizontal blanking period. In other words, one of the color difference signals which is transmitted within one horizontal scanning period (1H), is subjected to a time base compression into approximately 20% of 1H. In addition, to utilize the band effectively, the luminance signal is subjected to a time base compression into approximately 80% of 1H so as to occupy a band which is in the same range as the band of the time base compressed color difference signal, and transmitted. Further, the two color difference signals are time-division-multiplexed, as a line-sequential signal in which the two color difference signals are alternately transmitted for every 1H, with the time base compressed luminance signal. This time-division-multiplexed signal is supplied to a frequency modulator, and an output signal of the frequency modulator is recorded on the recording medium. At the time of the reproduction, a signal processing opposite to the signal processing carried out at the time of the recording, is carried out to obtain a reproduced composite color video signal. The recording and reproducing system employed in this proposed recording and reproducing apparatus, will hereinafter be referred to as a timeplex system.

According to the timeplex system which transmits the time-division-multiplexed signal, there is no duration in which the luminance signal and the color difference signal are transmitted simultaneously. In the case of the NTSC system color video signal and the PAL system color video signal, a mutual interference and moire may occur between the luminance signal and the color difference signals, because the luminance signal and the carrier chrominance signal are band-share-multiplexed and transmitted. However, such a mutual interference and moire will not occur according to the timeplex system. In addition, even when the color video signal of any one of the NTSC system, the PAL system, and the SECAM system is recorded by an azimuth recording and reproducing system on tracks having the horizontal synchronizing signals recorded in non-alignment between mutually adjacent tracks and then reproduced, there is substantially no crosstalk from the adjacent tracks due to the azimuth loss effect, and it is possible to obtain a reproduced picture of a high picture quality. This is because the time-division-multiplexed signal is recorded on the adjacent tracks in the form of a frequency modulated signal which is obtained by frequency-modulating by the time-division-multiplexed signal a high-frequency carrier which has a large azimuth loss effect.

The time base compressed luminance signal and the time base compressed color difference signal employed in the timeplex system, both have an energy distribution in which the energy is large in the low frequency range and the energy is small in the high frequency range. In other words, the time base compressed luminance signal and the time base compressed color difference signal assume a signal format which is suited for the frequency modulation Thus, it is possible to obtain a large modulation index, and the signal-to-noise ratio can be greatly improved. Moreover, it is possible to substantially eliminate a deviation in the reproducing time base when expanding the time base.

However, in the recording and reproducing apparatus which employs the timeplex system, a dropout may occur in the reproduced signal due to scratches on the recording medium such as a magnetic tape and dust particles or the like adhered on the recording medium. The conventional recording and reproducing apparatus employing the timeplex system, was not provided with a dropout compensation circuit for compensating for the dropout in the reproduced signal. Therefore, there was a problem in that the picture quality of the reproduced picture became deteriorated when such a dropout occurred in the reproduced signal.

SUMMARY OF THE INVENTION

Accordingly, it is a general object of the present invention to provide a novel and useful video signal dropout compensation circuit in which the problems described heretofore have been eliminated.

Another and more specific object of the present invention is to provide a video signal dropout compensation circuit which uses a reproduced frequency modulated signal which was obtained two horizontal scanning periods prior to a point when a dropout occurs, when the dropout occurs in a frequency modulated time-division-multiplexed signal which is reproduced from a recording medium. The time-division-multiplexed signal is obtained by subjecting a line-sequential color difference signal and a luminance signal corresponding to one horizontal scanning period to a time base compression, and time-division-multiplexing the time base compressed signals within a duration of one horizontal scanning period. According to the circuit of the present invention, it is possible to compensate for the dropout by the reproduced frequency modulated signal which was obtained two horizontal scanning periods prior to the point when the dropout occurs.

Still another object of the present invention is to provide a video signal dropout compensation circuit which uses a reproduced frequency modulated signal which was obtained one horizontal scanning period prior to a point when a dropout occurs, when the dropout occurs in a reproduced frequency modulated signal of the time base compressed luminance signal. According to the circuit of the present invention, it is possible to satisfactorily compensate for the dropout by a luminance information which was obtained one horizontal scanning period prior to the point when the dropout occurs, which luminance information more closely resembles the luminance signal which is dropped out compared to a luminance information which was obtained two horizontal scanning periods prior to the point when the dropout occurs.

A further object of the present invention is to provide a video signal dropout compensation circuit comprising time base expanding means including a digital memory circuit. The time base expanding means is supplied with a reproduced frequency modulated time-division-multiplexed signal from a switching circuit which selectively produces the reproduced frequency modulated time-division-multiplexed signal which has been delayed in a delay circuit by a duration of two horizontal scanning periods when a dropout occurs, and subjects a time base compressed luminance signal to a time base expansion so as to obtain a reproduced luminance signal in an original time base. When a dropout detection signal is generated within a duration in which the time base compressed luminance signal within an input frequency modulated time-division-multiplexed signal is reproduced, the switching circuit selectively produces the output signal of the delay circuit, and the write-in to the digital memory circuit is stopped and a reproduced time base compressed luminance signal which has been written two horizontal scanning periods prior to the point when the dropout occurs is read out from the digital memory circuit. On the other hand, when the dropout detection signal is generated within a duration in which the time base compressed color difference signal is reproduced, the switching circuit selectively produces a delayed frequency modulated time-division-multiplexed signal which is obtained from the delay circuit.

According to the circuit of the present invention, the digital memory circuit which is originally used for the time base expansion, can be commonly used for the dropout compensation. As a result, the circuit construction of the video signal dropout compensation circuit can be simplified.

Other objects and further features of the present invention will be apparent from the following detailed description when read in conjunction with the accompanying drawings.

BRIEF DESCRIPTION OF THE DRAWINGS

FIG. 5 is a systematic block diagram showing an embodiment of a position detecting circuit in the block system shown in FIG. 4;

FIGS. 6(A) through 6(G) show signal waveforms for explaining the operation of the block system shown in FIG. 5.

DETAILED DESCRIPTION

Figure 1:
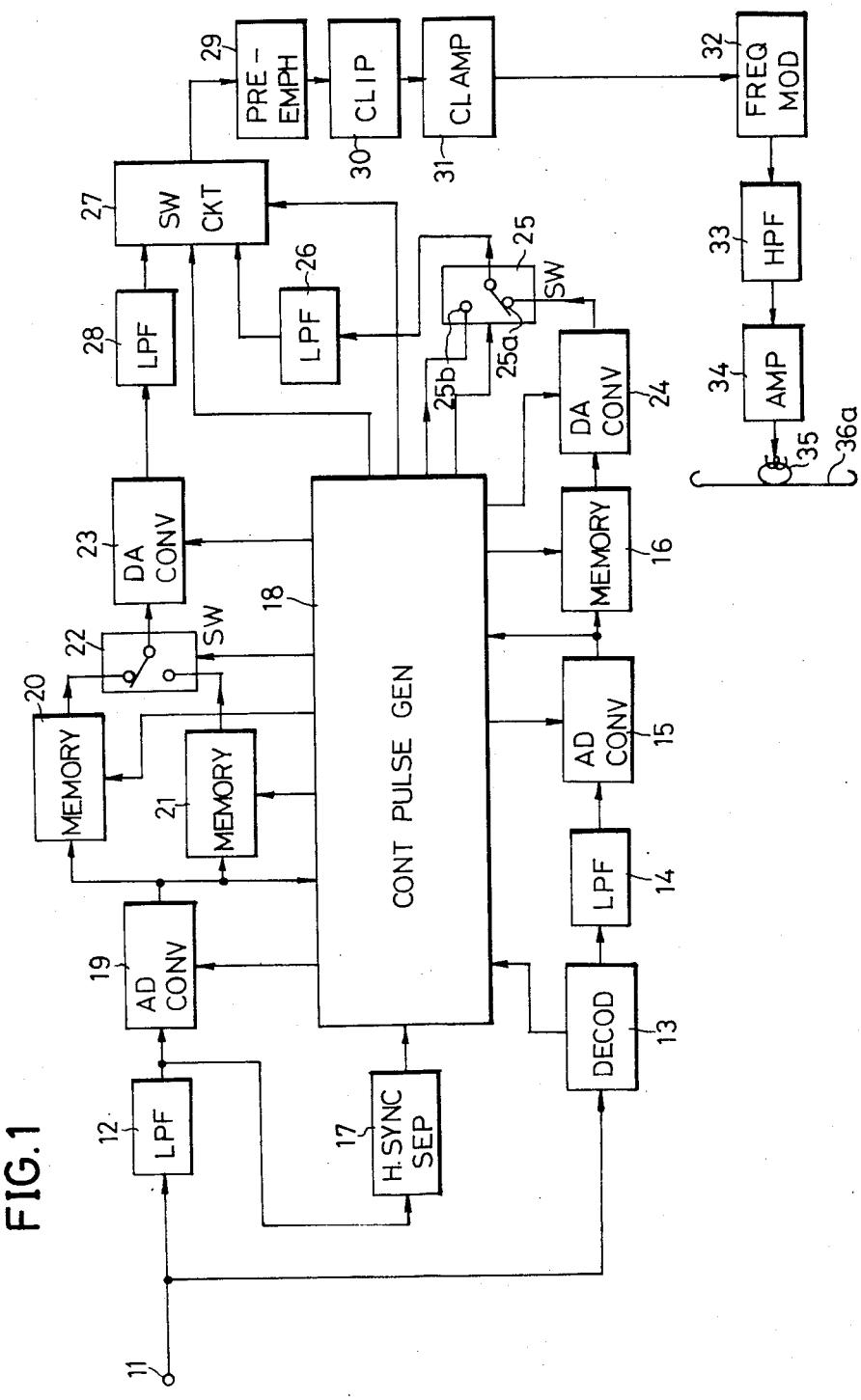
FIG. 1 is a systematic block diagram showing an example of a recording system which has been previously proposed by the present applicant, which recording system records a time-division-multiplexed signal based on the timeplex system.

Before describing the construction and operation of the video signal dropout compensation circuit according to the present invention, description will be given with respect to a recording system shown in FIG. 1. The recording system shown in FIG. 1 was previously proposed by the present applicants to record a time-division-multiplexed signal, and the video signal dropout compensation circuit according to the present invention reproduces a time-division-multiplexed signal which has been recorded by such a recording system. In FIG. 1, a SECAM system color video signal, for example, is applied to an input terminal 11. This color video signal is supplied to a lowpass filter 12 wherein a luminance signal is separated, and is also supplied to a decoder 13 wherein a carrier chrominance signal is separated. The separated carrier chrominance signal is then demodulated into a line-sequential color difference signal.

In the line-sequential color difference signal, there is a predetermined difference between the D.C. level of an achromatic color part (non-modulated carrier part) having a width of 4.9 µs and located in a back porch within one horizontal scanning period (1H) in which a color difference signal (B−Y) is transmitted, and the D.C. level of an achromatic color part (non-modulated carrier part) having a width of 4.9 μs and located in a back porch within 1H in which a color difference signal (R−Y) is transmitted. This is because a chrominance subcarrier frequency of the carrier chrominance signal is 4.25 MHz in the transmission line of the color difference signal (B−Y), and a chrominance subcarrier frequency of the carrier chrominance signal in the transmission line of the color difference signal (R−Y) is different from 4.25 MHz and is 4.406 MHz. The line-sequential color difference signal is subjected to a D.C. level shift, so that the D.C. level of the achromatic color part of one color difference signal coincides with the D.C. level of the achromatic color part of the other color difference signal, before being supplied to an analog-to-digital (AD) converter 15 through a lowpass filter 14. An output signal of the AD converter 15, is supplied to a memory circuit 16.

On the other hand, the luminance signal which is separated from the input SECAM system color video signal, is obtained from the lowpass filter 12. This luminance signal is supplied to a horizontal synchronizing signal separating circuit 17 wherein a horizontal synchronizing signal is separated. The separated horizontal synchronizing signal from the horizontal synchronizing signal separating circuit 17 is supplied to a control pulse generating device 18, together with a pulse which is obtained from a part of the decoder 13. The luminance signal from the lowpass filter 12 is also supplied to an AD converter 19 wherein the luminance signal is subjected to an analog-to-digital conversion. An output signal of the AD converter 19 is supplied to memory circuits 20 and 21. The memory circuits 16, 20, and 21 are each made up from a random access memory (RAM) and an address counter. Output digital signals of the AD converters 15 and 19 are supplied to the control pulse generating device 18. The control pulse generating device 18 generates various control pulses, and supplies the control pulses to the AD converters 15 and 19, the switching circuits 22, 25, and 27, and digital-to-analog (DA) converting circuits 23 and 24. In addition, the control pulse generating device 18 generates a write-in clock pulse and a read-out clock pulse with a predetermined timing and with a predetermined repetition frequency, and supplies these write-in and read-out clock pulses to the memory circuits 16, 20, and 21

In other words, the control pulse generating device 18 supplies a write-in clock pulse of 8 MHz, for example, to one of the memory circuits 20 and 21, so as to write into the one of the memory circuits 20 and 21 a luminance signal which corresponds to a duration of 1H and is transmitted within a video duration of 52 μs. At the same time, the control pulse generating device 18 supplies a read-out clock pulse of 10 MHz, for example, to the other of the memory circuits 20 and 21 immediately after the transmission of a time base compressed color difference signal corresponding to 1H (52 μs) is completed, so as to read out from the other of the memory circuits 20 and 21 a stored luminance signal which corresponds to 1H and was transmitted 1H before. The read-out clock pulse is supplied to the other of the memory circuits 20 and 21 for a duration which excludes from the duration of 1H a serial transmission period in which the horizontal synchronizing signal and the time base compressed color difference signal are transmitted. The read-out operation and the write-in operation with respect to the memory circuits 20 and 21, are alternately carried out for every 1H. In addition, the switching circuit 22 which is coupled to output sides of the memory circuits 20 and 21, is switched over in response to a control pulse from the control pulse generating device 18 so as to selectively pass an output signal of the memory circuit 20 or 21 which is carrying out the read-out operation. As a result, a luminance signal which has been time base compressed to 4/5, is intermittently obtained from the switching circuit 22 without a dropout of information. This time base compressed luminance signal from the switching circuit 22, is subjected to a digital-to-analog conversion in the DA converting circuit 23.

On the other hand, the line-sequential color difference signal is subjected to an analog-to-digital conversion in the AD converter 15 before being supplied to the memory circuit 16. The line-sequential color difference signal which is transmitted in a video duration of 52 μs within 1H (=64 μs), is written into the memory circuit 16 in response to a write-in clock pulse of 2 MHz, for example, which write-in clock pulse is received from the control pulse generating device 18. After a predetermined duration (1.6 μs, for example) from the time when this write-in operation is completed, a color difference signal which has been time base compressed to 1/5 is read out from the memory circuit 16 in response to a read-out clock pulse of 10 MHz, for example, which read-out clock pulse is received from the control pulse generating device 18. In this case, one read-out duration lasts for 10.4 μs.

The time base compressed line-sequential color difference signal from the memory circuit 16, is subjected to a digital-to-analog conversion in the DA converting circuit 24 before being supplied to a terminal 25a of the switching circuit 25. A D.C. level of the achromatic color part in the line-sequential color difference signal, which has been sampled and held in the control pulse generating device 18, is applied to a terminal 25b of the switching circuit 25. The switching of the switching circuit 25 is controlled by an output pulse of the control pulse generating device 18, so that the switching circuit 25 is switched over and connected to the terminal 25a immediately after the duration in which the D.C. level (color reference level) is applied to the terminal 25b ends. Thus, the switching circuit 25 selectively produces a signal in which the output time base compressed line-sequential color difference signal of the DA converting circuit 24 is time-division-multiplexed, immediately after the color reference level, and supplies this selectively produced signal to the switching circuit 27 through a lowpass filter 26. The DA converting circuits 23 and 24 each comprises a latch gate and a DA converter coupled thereto.

The switching circuit 27 is supplied with the time base compressed luminance signal from the DA converting circuit 23, through a lowpass filter 28. Further, the switching circuit 27 is also supplied with a multiplexed signal including the horizontal synchronizing signal having a width of approximately 4 μs and a discriminating burst signal. This multiplexed signal is generated in the control pulse generating device 18, from the horizontal synchronizing signal and the discriminating burst signal which are generated in the control pulse generating device 18. The discriminating burst signal is used to discriminate the color difference signals (B−Y) and (R−Y). In a case where a D.C. level difference between the achromatic color parts in the color difference signals (R−Y) and (B−Y) is eliminated by shifting the D.C. level of the achromatic color part in one of the color difference signals so as to coincide with the D.C. level of the achromatic color part in other of the color difference signals, and the recording and reproduction are carried out in this state where the D.C. level difference is eliminated, a discrimination must be performed to determine that a color difference signal which is obtained is either one of the two color difference signals in order to obtain the original carrier chrominance signal by use of a single frequency modulator in the reproducing system. In other words, the D.C. level difference between the achromatic color parts in the two color difference signals must be restored, before the original carrier chrominance signal can be obtained by the frequency modulator in the reproducing system. Accordingly, in a case where the recording and reproduction are carried out with the above D.C. level difference maintained, the discriminating burst signal will not be required since the discriminating information which enables the discrimination between the two color difference signals is transmitted as the D.C. level difference.

The switching of the switching circuit 27 is controlled by a pulse from the control pulse generating device 18. Accordingly, the switching circuit 27 produces a time-division-multiplexed signal in which the multiplexed signal from the control pulse generating device 18, the output signal of the lowpass filter 26, and the output signal of the lowpass filter 28 are time-division-multiplexed in sequence within a duration of 1H. In other words, in a duration of a certain 1H, the output signal of the switching circuit 27 is a time-division-multiplexed signal including the horizontal synchronizing signal from the control pulse generating device 18, the output signal of the lowpass filter 26, and the output signal of the lowpass filter 28. On the other hand, in a duration of 1H which is immediately subsequent to the certain 1H, the output signal of the switching circuit 27 is a time-division-multiplexed signal including the multiplexed signal from the control pulse generating device 18, the output signal of the lowpass filter 26, and the output signal of the lowpass filter 28, where the horizontal synchronizing signal and the discriminating burst signal generated in the control pulse generating device 18 are multiplexed in the multiplexed signal from the control pulse generating device 18.

Figure 2:
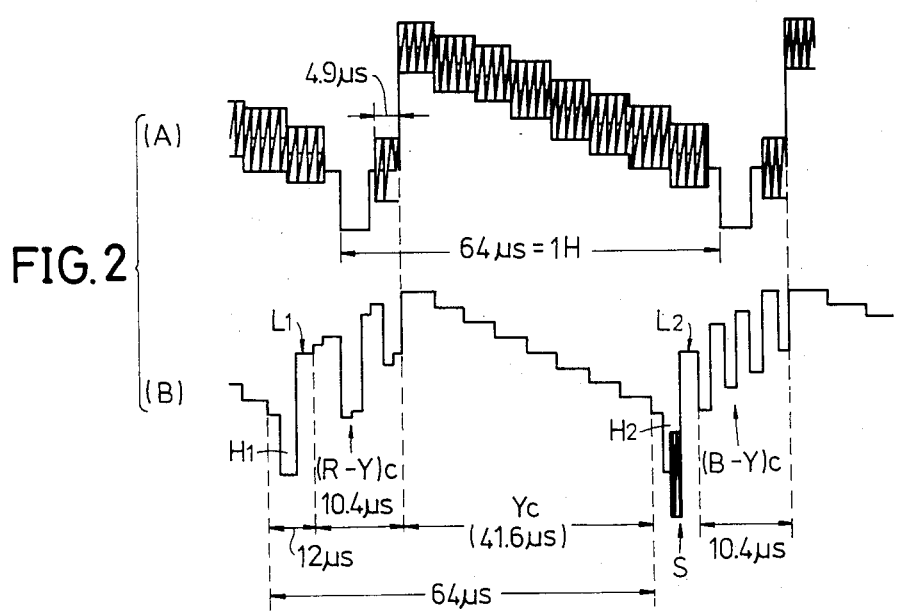
FIGS. 2(A) and 2(B) respectively show signal waveforms of an input color video signal to the block system shown in FIG. 1 and a time-division-multiplexed signal which is to be recorded.

When a SECAM system color video signal in the form of a color bar signal shown in FIG. 2(A) is applied to the input terminal 11, a time-division-multiplexed signal shown in FIG. 2(B) is produced from the switching circuit 27. As shown in FIG. 2(B), a discriminating burst signal S is multiplexed with a horizontal synchronizing signal $H_2$ for every 1H (=64 μs). In the time-division-multiplexed signal shown in FIG. 2(B), horizontal synchronizing signals $H_1$ and $H_2$, color reference levels $L_1$ and $L_2$ (the D.C. level of the achromatic color part of the respective color difference signals), the time base compressed color difference signals (R−Y) and (B−Y)$_C$, and a time base compressed luminance signal $Y_C$, and the time base compressed luminance signal $Y_C$ is transmitted line-sequentially. This time-division-multiplexed signal shown in FIG. 2(B) is passed through a known recording signal processing circuit in a video tape recorder (VTR), and recorded on a magnetic tape 36a by a recording head 35. The recording signal processing circuit comprises a pre-emphasis circuit 29, a white peak level clipping circuit 30, a clamping circuit 31, a frequency modulator 32, a highpass filter 33, and a recording amplifier 34.

The video signal dropout compensation circuit according to the present invention is provided in a reproducing apparatus which reproduces the recorded signal from a recording medium which is recorded with the above described time-division-multiplexed signal which has been frequency modulated. Description will hereinafter be given with respect to embodiments of the video signal dropout compensation circuit according to the present invention.

Figure 3:
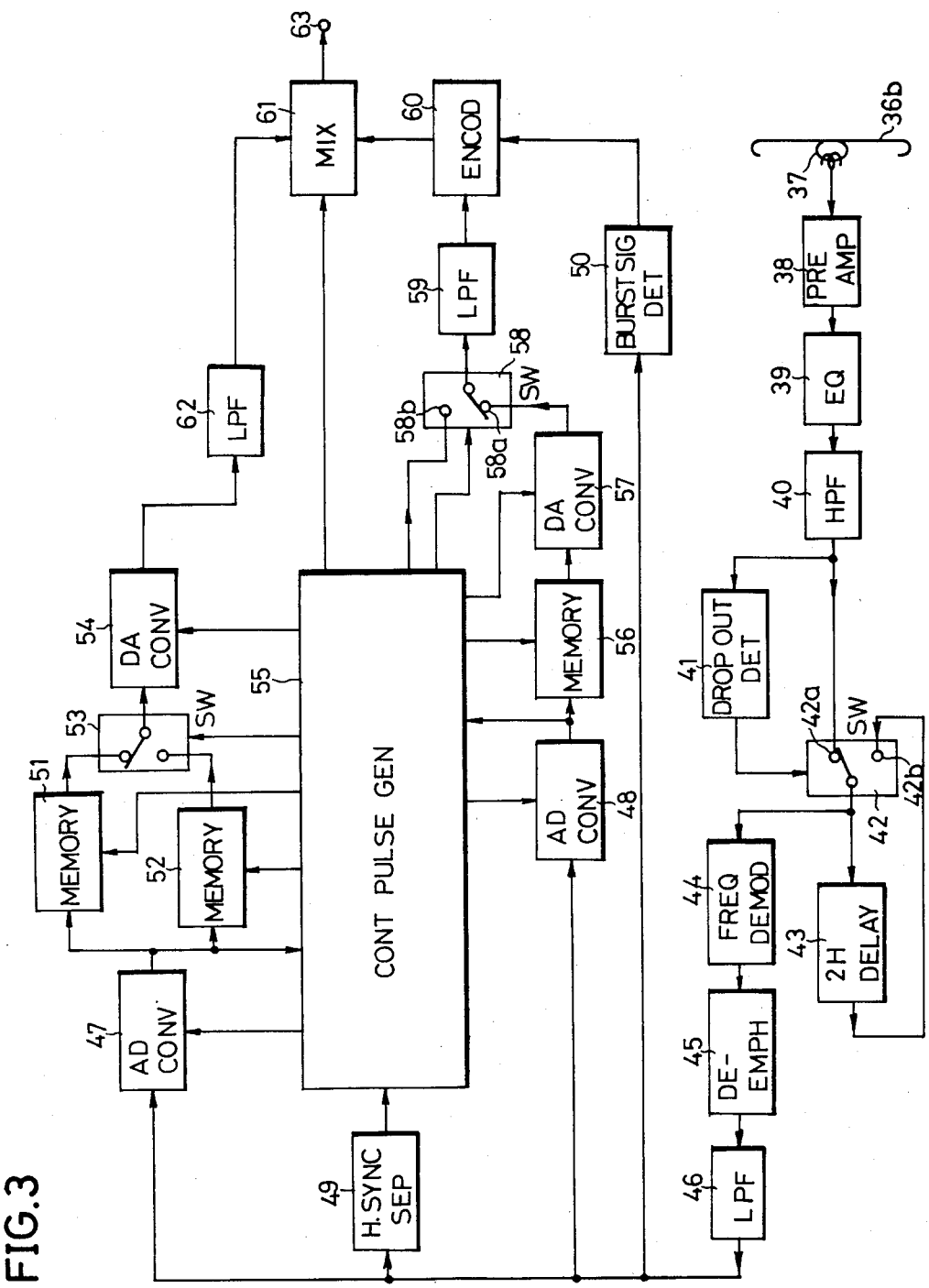
FIG. 3 is a systematic block diagram showing a reproducing apparatus having a first embodiment of a video signal dropout compensation circuit according to the present invention.

In FIG. 3, the signal recorded on a magnetic tape 36b is reproduced by a reproducing head 37. A frequency modulated time-division-multiplexed signal which is obtained by frequency-modulating a carrier by the time-division-multiplexed signal shown in FIG. 2(B), is supplied to a pre-amplifier 38 from the reproducing head 37. The frequency modulated time-division-multiplexed signal from the pre-amplifier 38, is supplied to a highpass filter 40 through an equalizer 39. An unwanted low-frequency component is eliminated in the highpass filter 40, and an output signal of the highpass filter 40 is supplied to a dropout detecting circuit 41 and to a terminal 42a of a switching circuit 42.

When a dropout occurs, the envelope level of the reproduced frequency modulated time-division-multiplexed signal becomes zero or becomes extremely small. The dropout detecting circuit 41 constantly detects whether the envelope level of the reproduced frequency modulated time-division-multiplexed signal has become zero or has become extremely small. For example, the dropout detecting circuit 41 generates a dropout detection signal of a high-level when the envelope level has become zero or has become extremely small. Otherwise, that is, when the reproduction is carried out in a normal manner and the dropout does not occur, the dropout detecting circuit 41 generates a low-level signal. In other words, the dropout detecting circuit 41 does not generate the dropout detection signal when the dropout does not occur. The construction of the dropout detecting circuit 41 itself is known, and a commercially available integrated circuit (IC) AN6326 manufactured by Matsushita Electronics Corporation of Japan, for example, may be used for the dropout detecting circuit 41.

A 2H delay circuit 43 for delaying the output reproduced signal from the switching circuit 42 by a duration of two horizontal scanning periods (2H), supplies an output delayed frequency modulated time-division-multiplexed signal to a terminal 42b of the switching circuit 42. The switching of the switching circuit 42 is controlled by the output signal of the dropout detecting circuit 41. In other words, during a normal reproduction in which no dropout occurs, the switching circuit 42 selectively produces the reproduced frequency modulated time-division-multiplexed signal from the highpass filter 40 which is applied to the terminal 42a thereof. On the other hand, the switching circuit 42 selectively produces the output signal of the 2H delay circuit 43 which is applied to the terminal 42b thereof, when a dropout occurs during the reproduction.

The frequency modulated time-division-multiplexed signal from the switching circuit 42, is supplied to a frequency demodulator 44 wherein the signal is demodulated into the reproduced time-division-multiplexed signal shown in FIG. 2(B). The reproduced time-division-multiplexed signal from the frequency demodulator 44 is supplied to a lowpass filter 46 through a de-emphasis circuit 45. An output signal of the lowpass filter 46 is supplied to AD converters 47 and 48, a horizontal synchronizing signal separating circuit 49, and a discriminating burst signal detector 50. A circuit part which is constituted by the AD converter 47, memory circuits 51 and 52, a switching circuit 53, and a DA converting circuit 54, performs a time base expansion based on output pulses of a control pulse generating device 55 which generates various control pulses, so as to produce a reproduced luminance signal which has been returned to its original time base.

When one of the memory circuits 51 and 52 is carrying out a write-in operation with respect to the time base compressed luminance signal in the reproduced time-division-multiplexed signal, the other of the memory circuit 51 and 52 carries out a read-out operation. Further, the memory circuits 51 and 52 alternately carry out the read-out operation and the write-in operation for every 1H. The switching of the switching circuit 53 is controlled by a pulse from the control pulse generating device 55, so that the switching circuit 53 selectively produces the read out digital signal from the memory circuit 51 or 52 which is carrying out the read-out operation. The DA converting circuit 54 subjects the output digital signal of the switching circuit 53 to a digital-to-analog conversion, to obtain a reproduced luminance signal having an analog signal waveform. The repetition frequency of the write-in clock pulse which is supplied to the memory circuits 51 and 52 from the control pulse generating device 55 is 10 MHz, for example, and the repetition frequency of the read-out clock pulse which is supplied to the memory circuit 51 and 52 is 8 MHz, for example. As a result, a reproduced digital luminance signal which has been time base expanded to 5/4 and returned to its original time base, is obtained from the switching circuit 53. Thus, the DA converting circuit 54 produces the reproduced luminance signal having the analog signal waveform, which reproduced luminance signal has been returned to its original time base.

On the other hand, a circuit part which is made up from an AD converter 48, a memory circuit 56, and a DA converting circuit 57, writes the time base compressed color difference signal within the reproduced time-division-multiplexed signal in the memory circuit 56 based on the output signals of the control pulse generating device 55 and thereafter carries out a read-out operation, so as to obtain a line-sequential color difference signal which has been returned to its original time base. In other words, the digital signal of the reproduced time base compressed color difference signal is written in the memory circuit 55 by a write-in clock pulse of 10 MHz, for example, and a digital signal of a reproduced line-sequential color difference signal which has been returned to its original time base by expanding the time base to 5 times, is read out from the memory circuit 56 by a read-out clock pulse of 2 MHz. The digital signal which is read out from the memory circuit 56, is converted into a reproduced line-sequential color difference signal in the DA converting circuit 57. This reproduced line-sequential color difference signal from the DA converting circuit 57, is applied to a terminal 58a of a switching circuit 58. A color reference level (indicated by $L_1$ and $L_2$ in FIG. 2(B)) which is obtained in the control pulse generating device 55 by sampling and holding, is applied to a terminal 58b of the switching circuit 58. At the time of the reproduction, the switching circuit 58 is connected to the terminal 58b for the duration of 10.4 $\mu$s in which the time base compressed color difference signal is transmitted, and is otherwise switched over and connected to the terminal 58a. As a result, the switching circuit 58 produces a reproduced line-sequential color difference signal which has been returned to its original time base and in which the D.C. level of the achromatic color part has been added. This reproduced line-sequential color difference signal from the switching circuit 58 is supplied to a first input terminal of an encoder 60, through a lowpass filter 59. The discriminating burst signal of 1.6 MHz described before, is detected in the discriminating burst signal detector 50, and the output signal of the discriminating burst signal detector 45 is supplied to a second input terminal of the encoder 60.

The encoder 60 gives a predetermined D.C. level difference between the color difference signals (R−Y) and (B−Y) of the reproduced line-sequential color difference signal, before performing a frequency modulation to obtain a frequency modulated signal. Further, the encoder 60 transmits this frequency modulated signal only for a duration which excludes a predetermined duration of the frequency modulated signal. In other words, the encoder 60 transmits the frequency modulated signal for a duration which excludes the duration of the horizontal synchronizing signal, the durations in the vicinity of the horizontal synchronizing signal, and the like, to produce a frequency modulated signal which is a carrier chrominance signal in conformance with the SECAM system.

The reproduced carrier chrominance signal which is in conformance with the SECAM system and is obtained from an output terminal of the encoder 60, is supplied to a mixing circuit 61. This reproduced carrier chrominance signal, the reproduced luminance signal which is obtained from the DA converting circuit 54 through a lowpass filter 62, and synchronizing signals from the control pulse generating device 55, are respectively mixed in the mixing circuit 61. As a result, a reproduced color video signal in conformance with the SECAM system, is produced from the mixing circuit 61 through an output terminal 63.

When a dropout occurs, the switching circuit 42 produces the time-division-multiplexed signal which was obtained 2H prior to the point when the dropout occurred. The time base compressed luminance signal within the time-division-multiplexed signal of 2H before, contains a luminance signal which closely resembles the luminance information of the time base compressed luminance signal which is missing due to the dropout. In addition, the kind of the time base compressed color difference signal within the time-division-multiplexed signal of 2H before, is the same as the kind of the color difference signal which is missing due to the dropout. Further, the time base compressed color difference signal within the time-division-multiplexed signal of 2H before, contains a color information which closely resembles the color information of the time base compressed color difference signal which is missing due to the dropout. Therefore, even when a signal information is missing due to the dropout, the dropout can be compensated by replacing the dropout by a signal information which closely resembles the signal information which is missing.

Figure 4:
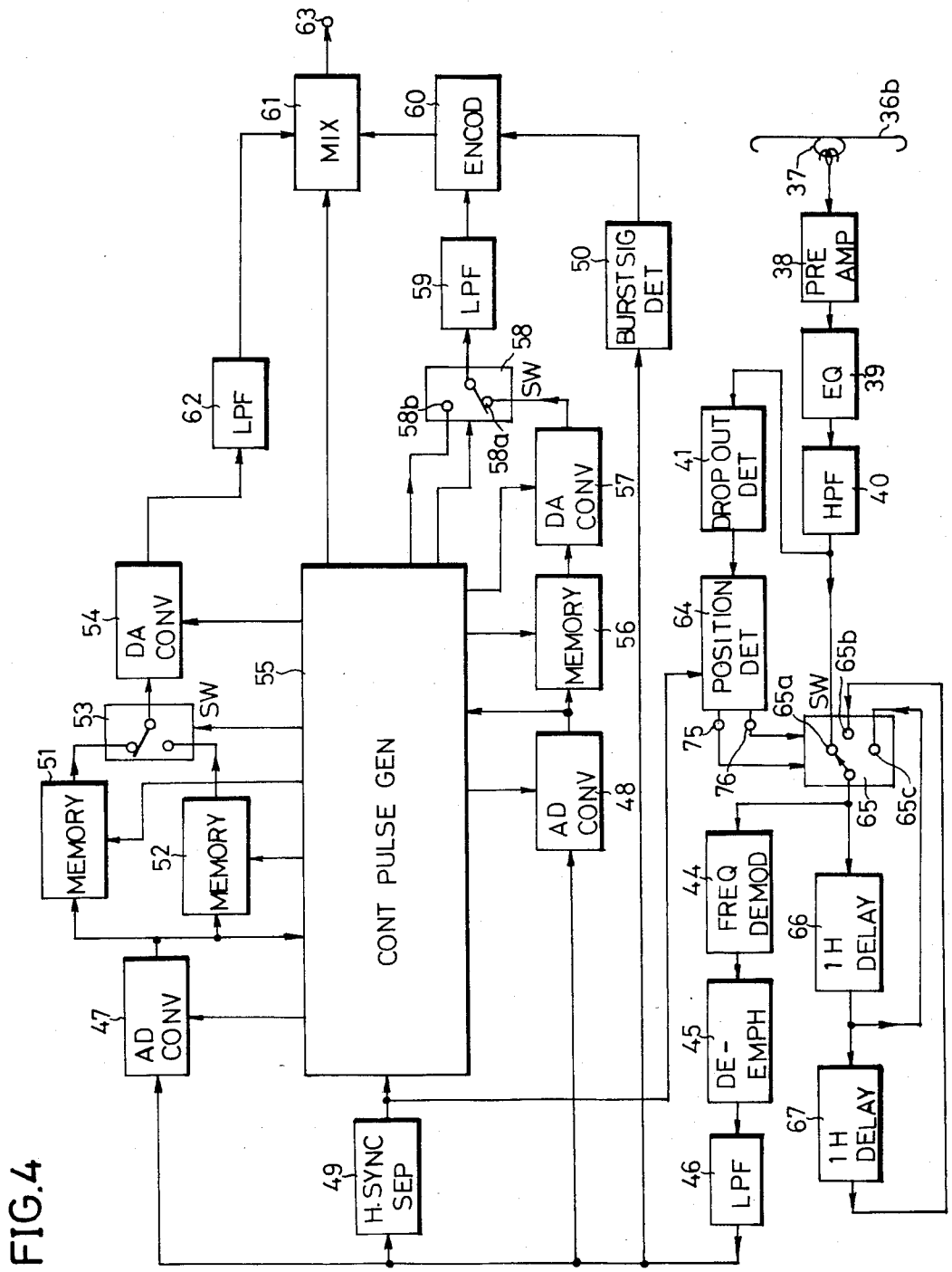
FIG. 4 is a systematic block diagram showing a reproducing apparatus having a second embodiment of a video signal dropout compensation circuit according to the present invention.

Next, description will be given with respect to a second embodiment of a video signal dropout compensation circuit according to the present invention, by referring to FIGS. 4 through 6. In FIG. 4, those parts which are the same as those corresponding parts in FIG. 3 are designated by the same reference numerals, and their description will be omitted. In FIG. 4, the output signal of the dropout detecting circuit 41 is supplied to a position detecting circuit 64. A switching circuit 65 comprises terminals 65a, 65b, and 65c. The reproduced frequency modulated time-division-multiplexed signal from the highpass filter 40, is supplied to the terminal 65a. An output signal of a 1H delay circuit 67, which has been delayed by a total of 2H in a 1H delay circuit 66 and the 1H delay circuit 67, is supplied to the terminal 65b. Further, an output signal of the 1H delay circuit 66, which has been delayed by 1H, is supplied to the terminal 65c.

The horizontal synchronizing signal within the reproduced frequency modulated time-division-multiplexed signal, which is separated in the horizontal synchronizing signal separating circuit 49, is supplied to the position detecting circuit 64. When the dropout detection signal from the dropout detecting circuit 41 is supplied to the position detecting circuit 64, the position detecting circuit 64 detects the position within the reproduced frequency modulated time-division-multiplexed signal where the dropout has occurred. In other words, the position detecting circuit 64 has a construction shown in FIG. 5, for example. In FIG. 5, a reproduced horizontal synchronizing signal a shown in FIG. 6(B) which is separated from a reproduced time-division-multiplexed signal shown in FIG. 2(B) or 6(A) in the horizontal synchronizing signal separating circuit 49, is applied to a reset terminal of a counter 68 through an input terminal 69. An oscillation pulse b shown in FIG. 6(C) which is produced from an oscillator 70, is applied to a clock terminal of the counter 68.

Hence, the counter 68 is reset with every incoming rising edge of the reproduced horizontal synchronizing signal a, and starts to count the oscillation pulse b from the point when the counter 68 is reset. The counter 68 produces a high-level signal only for a counting duration which has been preset and in which the counter 68 counts between a first counted value and a second counted value. The preset counting duration is selected to a duration in which the color reference level and the time base compressed line-sequential color difference signal are transmitted in series. Accordingly, the counter 68 produces a pulse c shown in FIG. 6(D). This pulse c is supplied to one input terminal of an AND circuit 71, and to one input terminal of an AND circuit 73 through an inverter 72. A dropout detection signal d shown in FIG. 6(E) which is obtained from the dropout detecting circuit 41, is supplied to another input terminal of the AND circuit 71 and to another input terminal of the AND circuit 73, through an input terminal 74. As a result, as represented by a pulse e shown in FIG. 6(F), the AND circuit 71 passes the dropout detection signal d through an output terminal 75, only when the dropout detection signal d is applied to the input terminal 74 in a duration T1 in which the color reference level and the time base compressed line-sequential color difference signal are transmitted in series. On the other hand, as represented by a pulse f shown in FIG. 6(G), the AND circuit 73 passes the dropout detection signal d through an output terminal 76, only when the dropout detection signal d is applied to the input terminal 74 in a remaining duration T2 which is obtained by subtracting the above duration T1 from 1H.

Returning now to the description of the circuit shown in FIG. 4, the pulses e and f from the output terminals 75 and 76 are supplied to the switching circuit 65 as switching pulses. When both the pulses e and f assume a high level, or when both the pulses e and f assume a low level, the switching circuit 65 is connected to the terminal 65a. When the pulse e assumes a high level and the pulse f assumes a low level, the switching circuit 65 is connected to the terminal 65b. Further, the switching circuit 65 is connected to the terminal 65c when the pulse e assumes a low level and the pulse f assumes a high level. Thus, during the normal reproduction in which no dropout occurs, the position detecting circuit 64 connects the switching circuit 65 to the terminal 65a. The position detecting circuit 64 connects the switching circuit 65 to the terminal 65b when the position detecting circuit 64 detects that a dropout has occurred within the duration T1 in which the time base compressed color difference signal and the like are reproduced, so that the switching circuit 65 produces a signal which has been delayed by a total of 2H in the 2H delay circuits 66 and 67. In addition, when the position detecting circuit 64 detects that a dropout has occurred within the duration T2 in which the time base compressed luminance signal and the like are reproduced, the position detecting circuit 64 connects the switching circuit 65 to the terminal 65c, so that the switching circuit 65 produces a signal which has been delayed by 1H in the 1H delay circuit 66.

Therefore, according to the present embodiment, when the dropout occurs within the duration T1 in which the time base compressed color difference signal and the like are reproduced, the reproduced time base compressed color difference signal which is missing due to the dropout is replaced by the reproduced time base compressed color difference signal which was obtained 2H before the point when the dropout occurred, as in the case of the first embodiment described previously. On the other hand, when the dropout occurs within the duration T2 in which the time base compressed luminance signal and the like are reproduced, the reproduced time base compressed luminance signal which is missing due to the dropout is replaced by the reproduced time base compressed luminance signal which was obtained 1H before the point when the dropout occurred. The correlation between the luminance information of signals which are separate by 1H, is stronger than the correlation between the luminance information of signals which are separated by 2H. Thus, the compensation of the dropout with respect to the luminance signal, is improved in the present embodiment when compared to the first embodiment described previously.

Figure 7:
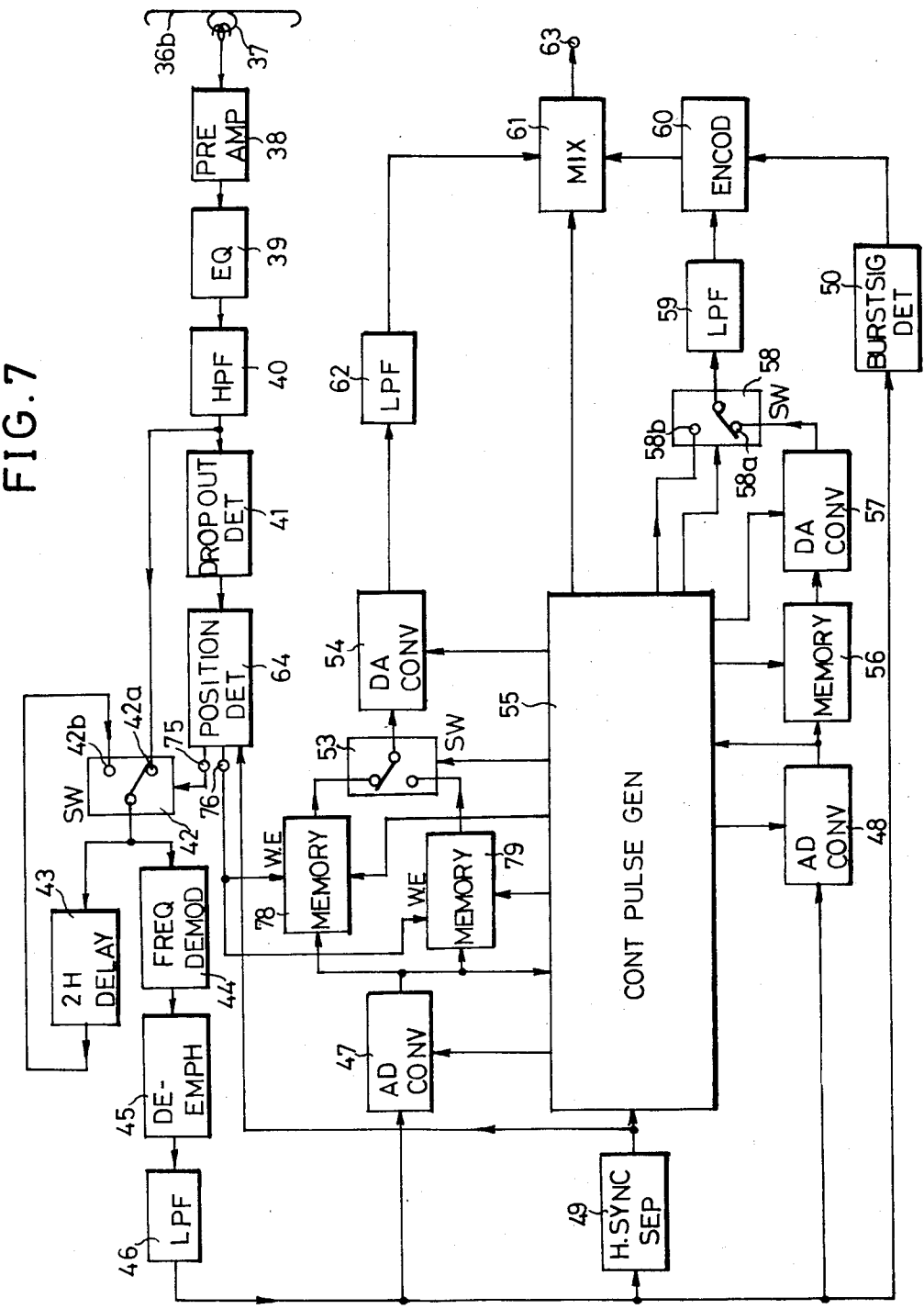
FIG. 7 is a systematic block diagram showing a reproducing apparatus having a third embodiment of a video signal dropout compensation circuit according to the present invention.

Next, description will be given with respect to a third embodiment of a video signal dropout compensation circuit according to the present invention, by referring to FIG. 7. In FIG. 7, those parts which are the same as those corresponding parts in FIGS. 3 and 4 are designated by the same reference numerals, and their description will be omitted. In FIG. 7, the output pulse from the output terminal 75 of the position detecting circuit 64, is applied to the switching circuit 42 as a switching pulse. Further, the output pulse from the output terminal 76 of the position detecting circuit 64, is applied to respective write enable terminals (W.E.) of memory circuits 78 and 79. The output pulse from the output terminal 76 forcibly stops the write-in operation of the memory circuit 78 or 79 which is carrying out the write-in operation, for a duration in which this output pulse assumes a high level. Accordingly, even while the write-in clock pulse is applied to the memory circuits 78 and 79, the memory circuits 78 and 79 only carry out the write-in operation while a low-level signal is applied to the respective write enable terminals thereof, and the memory circuits 78 and 79 do not carry out the write-in operation and the read-out operation while a high-level signal is applied to the respective write enable terminals thereof. On the other hand, the memory circuits 78 and 79 carry out a predetermined read-out operation regardless of the level of the signal which is applied to the respective write enable terminals thereof.

As in the case of the memory circuits 51 and 52 described before, the memory circuits 78 and 79 are controlled by clock pulses from the control pulse generating device 55 so that one of the memory circuits 78 and 79 carries out a read-out operation while the other of the memory circuits 78 and 79 carries out a write-in operation. Moreover, the memory circuits 78 and 79 are controlled so as to alternately carry out a write-in operation and a read-out operation for every 1H. As a result, a time base compressed luminance signal is time base expanded to the extent it was time base compressed, and is then read out from the memory circuits 78 and 79.

Therefore, when a dropout has not occurred, the switching circuit 42 selectively produces the output signal of the highpass filter 40 because the output signals from the output terminals 75 and 76 of the position detecting circuit 64 both assume a low level. Hence, the write-in operation of the memory circuit 78 and 79 will not be stopped, and the memory circuits 78 and 79 repeat an operation in which the write-in and read-out operations are alternately carried out for every 1H.

When the dropout occurs within the duration in which the time base compressed luminance signal is reproduced, the output signal from the output terminal 76 of the position detecting circuit 64 assumes a high level, and the output signal from the output terminal 75 assumes a low level. Accordingly, the switching circuit 42 remains connected to the terminal 42a, and the time base compressed line-sequential color difference signal which is presently being reproduced is supplied to the AD converter 48. On the other hand, the write-in operation of the memory circuit 78 or 79 is forcibly stopped for the duration in which the dropout occurs, and the write-in operation is resumed from an address which corresponds to a reproducing point after the dropout has terminated. As a result, the reproduced time base compressed luminance signal of 2H before the point when the dropout occurred, remains stored at the addresses in the memory circuit 78 or 79 where the reproduced time base compressed luminance signal which is missing due to the dropout would have been written if the dropout did not occur.

On the other hand, the memory circuit 78 or 79 which is carrying out the read-out operation, carried out the read-out operation in a normal manner without being limited of the read-out operation. Thus, the reproduced luminance signal which is supplied to the mixing circuit 61 through the switching circuit 53, the DA converting circuit 54, and the lowpass filter 62, will not be missing even at the point when the dropout occurs. In addition, a reproduced signal which was obtained 1H before the reproducing point, is constantly supplied to the mixing circuit 61 for the purpose of time base expansion. Hence, the signal which was obtained at the point when the dropout occurred, is supplied to the mixing circuit 61 1H after the point when the dropout occurred. However, as described before, the write-in operation of the memory circuit 78 or 79 is forcibly stopped in the duration in which the dropout occurs, and the reproduced time base compressed luminance signal which was obtained 2H before the point when the dropout occurred remains stored in the memory circuit 78 or 79 to be read out therefrom instead of the reproduced time base compressed luminance signal which is missing due to the dropout. Therefore, in the duration in which the dropout occurs, the reproduced luminance signal is replaced by the reproduced luminance signal which was obtained 2H before the point when the dropout occurred, so as to compensate for the dropout.

When the dropout occurs within a duration in which the time base compressed color difference signal is reproduced, the switching circuit 42 is switched and connected to the terminal 42b as in the case of the first embodiment described previously. Thus, the switching circuit 42 selectively produces the time base compressed color difference signal from the 2H delay circuit 43 which was obtained 2H before, and supplies this time base compressed color difference signal to the time base expanding circuit which is made up from the memory circuit 56 and the like. Therefore, the dropout can also be compensated satisfactorily in this case.

The present invention is not limited to the dropout compensation in the reproduced output of the time-division-multiplexed signal which is produced from a SECAM system color video signal shown in FIG. 2(A). For example, the present invention can also be applied to a dropout compensation in the reproduced output of a time-division-multiplexed signal which is produced from the NTSC system or the PAL system color video signal based on the timeplex system.

Further, the present invention is not limited to these embodiments, but various variations and modifications may be made without departing from the scope of the present invention.

What is claimed is:

1. A new video signal dropout compensation circuit in a reproducing apparatus which is designed to reproduce a recorded signal from a recording medium, said recording medium being recorded with a time-division-multiplexed signal which has been frequency modulated, each horizontal scanning period of said time-division-multiplexed signal comprising a first transmitting duration in which a time base compressed luminance signal is transmitted and a second transmitting duration in which a time base compressed line-sequential color difference signal is transmitted, said reproducing apparatus frequency-demodulating a reproduced frequency modulated time-division-multiplexed signal in a frequency demodulator, and time base expanding the time base compressed line-sequential color difference signal and the time base compressed luminance signal which are within the reproduced time-division-multiplexed signal back to an original time base so as to obtain a reproduced line-sequential color difference signal and a reproduced luminance signal, said dropout compensation circuit comprising:

a dropout detecting circuit for producing a dropout detection signal when said reproduced frequency modulated time-division-multiplexed signal assumes a level which is smaller than a preset predetermined level;

a position detecting circuit supplied with the output signal of said dropout detecting circuit for passing said dropout detection signal through a first output terminal when said dropout detection signal is supplied thereto within said first transmitting duration and for passing said dropout detection signal through a second output terminal when said dropout detection signal is supplied thereto within said second transmitting duration;

a switching circuit which is controlled in response to signals from said first and second output terminals of said position detecting circuit; and delay means supplied with a signal which is selectively passed by said switching circuit for delaying said signal which is selectively passed by said switching circuit, said delay means comprising first and second delay circuits which are connected in series and respectively have a delay time of one horizontal scanning period, said switching circuit comprising a first terminal supplied with said reproduced frequency modulated time-division-multiplexed signal, a second terminal supplied with an output signal of said second delay circuit which has been delayed by a total delay time of two horizontal scanning periods, and a third terminal supplied with an output signal of said first delay circuit which has been delayed by a delay time of one horizontal scanning period, said position detecting circuit controlling said switching circuit so as to selectively pass an input signal to said third terminal when said dropout detection signal is supplied to said switching circuit only through said first output terminal of said position detecting circuit, to selectively pass an input signal to said second terminal when said dropout detection signal is supplied to said switching circuit only through said second output terminal of said position detecting circuit, and to selectively pass an input signal to said first terminal when said dropout detection signal is not produced by said dropout detecting circuit.

2. A video signal dropout compensation circuit as claimed in claim 1 in which said position detecting circuit comprises a counter, a first input terminal coupled to a reset terminal of said counter and supplied with a reproduced horizontal synchronizing signal within said reproduced time-division-multiplexed signal, an oscillator for producing a pulse having a predetermined repetition frequency and for supplying the produced pulse to a count input terminal of said counter, a second input terminal supplied with the output signal of said dropout detecting circuit, means for obtaining from said counter a counted output signal which assumes a first level in said first transmitting duration and assumes a second level in said second transmitting duration, and gating circuit means supplied with said counted output signal and an input signal to said second input terminal, for passing said dropout detection signal through said first output terminal when said dropout detection signal is supplied to said second input terminal in a duration in which said counted output signal assumes said first level, and for passing said dropout detection signal through said second output terminal when said dropout detection signal is supplied to said second input terminal in a duration in which said counted output signal assumes said second level.

3. A video signal dropout compensation circuit in a reproducing apparatus which is designed to reproduce a recorded signal from a recording medium, said recording medium being recorded with a time-division-multiplexed signal which has been frequency modulated, each horizontal scanning period of said time-division-multiplexed signal comprising a first transmitting duration in which a time base compressed luminance signal is transmitted and a second transmitting duration in which a time base compressed line-sequential color difference signal is transmitted, said reproducing apparatus frequency-demodulating a reproduced frequency modulated time-division-multiplexed signal in a frequency demodulator, and time base expanding the time base compressed line-sequential color difference signal and the time base compressed luminance signal which are within the reproduced time-divisional-multiplexed signal back to an original time base so as to obtain a reproduced line-sequential color difference signal and a reproduced luminance signal, said dropout compensation circuit comprising:

a dropout detecting circuit for producing a dropout detection signal when said reproduced frequency modulated time-division-multiplexed signal assumes a level which is smaller than a preset predetermined level;

a position detecting circuit supplied with the output signal of said dropout detecting circuit for passing said dropout detection signal through a first output terminal when said dropout detection signal is supplied thereto within said first transmitting duration and for passing said dropout detection signal through a second output termianl when said dropout detection signal is supplied thereto within said second transmitting duration;

a switching circuit which is controlled in response to an output signal from said second output terminal of said position detecting circuit;

a delay circuit supplied with a signal which is selectively passed by said switching circuit for delaying said signal which is selectively passed by said switching circuit, by a delay time of two horizontal scanning periods; and digital memory circuit means for writing therein said time base compressed luminance signal within said reproduced time-division-multiplexed signal and reading therefrom the written time base compressed luminance signal so as to time base expand the written time base compressed luminance signal to the original time base, said switching circuit selectively passing said reproduced frequency modulated time-division-multiplexed signal and supplying said reproduced time-division-multiplexed signal to said digital memory circuit means and to said delay circuit in a duration in which said dropout detection signal is supplied to said switching circuit through said second output terminal of said position detecting circuit, and selectively passing an output signal of said delay circuit and supplying the output signal of said delay circuit to said digital memory circuit means and to said delay circuit in a duration in which said dropout detection signal is supplied to said switching circuit through said second output terminal of said position detecting circuit, said digital memory circuit means being forcibly stopped of its write-in operation only while said dropout detection signal is supplied to said digital memory circuit means through said first output terminal of said position detecting circuit.

* * * * *